Patented Aug. 14, 1945

2,382,443

UNITED STATES PATENT OFFICE 2,382,443

COMPOSITION FOR LINING CAN ENDS

John E. Robinson, Glen Ellyn, and Frank H. Bopp and Paul W. Millelot, Jr., Maywood, Ill., assignors to American Can Company, New York, N. Y., a corporation of New Jersey No Drawing. Application November 19, 1941, Serial No. 419,810

1 Claim. (Cl. 260—9)

The present invention relates to compounds for lining can ends and the like which are used in containers for packaging certain food products and has particular reference to a non-deteriorating compound and to the manner in which it is produced, such a compound consisting of materials which will not be dissolved or disturbed by food products containing animal or vegetable oils and fats.

Food products containing animal or vegetable oils and fats are many and varied. Fish products, such as mackerel fillets or sardines, for example, are canned in large quantities and these represent animal oil products. As representative of another class of product which has been canned, brown bread, which contains vegetable oils and fats, may be mentioned. These two examples are indicative of a large class of products containing animal and vegetable oils which are exceedingly hard to hold successfully.

Rubber has been used in some form or other in the usual compounds for can seams but rubber is not adapted to oil products which soften the rubber and soon render it impotent or ineffective as a gasket.

The greatest difficulty experienced in the use of gaskets for brown bread cans, for example, occurs at the period of processing the product which is usually performed by means of steam. At such time the top or cover end of the can is loosely clinched onto the can containing the product and in this condition the oily product easily penetrates the gasket. If a conventional rubber gasket is used, the steam of processing together with the oil in the product so softens the gasket that by the time the processing is complete and the can is ready to be sealed the rubber compound is no longer efficient as a sealing material with the result that the can is improperly sealed.

The present invention contemplates the provision of an improved can lining compound by the use of a linear polymer of polybutene, or polybutylene, and such compound is not injuriously affected by contact with hot or cold animal and vegetable oils and fats but when used as a gasket in the can joints of cans containing such oils and fats remains as an efficient sealing medium even though continuously subjected to the oils and fats of the product and even after a processing period during which time the compound resists and is not substantially affected by such oils and fats.

An object of the invention is the provision of a method of making a lining compound for can seams which is simple to produce by well known processes used in gasket compound manufacture and which is adapted for sealing can joints on cans used for products containing animal and vegetable oils.

Another object of the invention is the provision of a can lining compound possessing certain desirable characteristics such as resistance to animal and vegetable oils while maintaining the full sealing qualities within the seam.

Numerous other objects and advantages of the invention will be apparent as it is better understood from the following description which is of a preferred embodiment thereof.

The can lining compound of the present invention comprises basically a linear polymer of polybutene and a wood flour filler combined in such a manner as to produce a gasket material. Preferably such a material is made liquid by the addition of a low boiling point solvent. This liquid mixture may be used in conventional compound lining machines such as those which employ a nozzle for the discharge of the liquid compound directly into the flange of a can end.

This compound material is of such a nature that it is air dried without the use of heat. After drying the mixture remains sufficiently plastic and workable as the can seam is being made, to give the full sealing effect to the joint at all times.

In addition to the basic ingredients, an amorphous wax and a suitable solvent may be used. The wax imparts softens to the liner so that it will function properly to completely fill and seal the spaces within the seam. The amount of wax is varied to meet the required conditions of plasticity. A petroleum naphtha solvent having a low boiling point is or may be used to impart a proper viscosity to the mixture and to provide a liquefied compound suitable for nozzle discharge.

The following formula and the procedure for mixing the component parts has been found to meet the requirements for a compound to line the seams of cans used for holding brown bread. The same formula may be used without any change for holding fish such as sardines and mackerel fillets. Slightly different proportions of the individual materials will be used for some other oil and fat containing food products and different processing procedure would also call for certain minor adjustments in the formula.

A linear polymer of polybutene_____pounds__ 44
Wood flour (300 mesh)_____do____ 44
Mid - Continent 160° brown amorphous
  wax _____pounds__ 12
A petroleum naphtha_____gallons__ 69

The best procedure for mixing these materials is to first thoroughly mill the polybutene until it is smooth. This operation is done on a regular so called "rubber mill" which is used for milling rubber sheets, etc. Preferably the amorphous wax is slowly incorporated with the polybutene as the milling action continues. The mill now functions as a dispersing device in which the wax is thoroughly mixed and incorporated with the polybutene.

While the milling continues the wood flour is added. The total milling and mixing time until the three parts are homogeneously dispersed to form a uniform mass usually requires from 30 to 45 minutes. This provides the compound mass.

A satisfactory way of transforming the compound into the desired liquid form for use in the nozzle type lining machine is to cut up the milled stock into small pieces and add them to the petroleum naphtha solvent in a suitable mixing tank. Complete solution must take place to carry out this step in the procedure and when there is complete homogeneous dispersion the compound is ready for application to the can end flange by means of the regular lining machine.

The low boiling solvent referred to in this description is included in a boiling range of 140° to 160° F. and this range is used to insure elimination of any "heavy ends" which might impart an off-taste to the product. By "heavy ends" is meant higher boiling fractions of the solvents which are not driven off from the compound in the can ends prior to the seam joints being made and in which there is always a danger of such solvents contaminating the food product. Where petroleum naphthas are used, as in the example given, the higher boiling naphthas will include kerosene which if permitted to contact the food product will impart an off-taste and odor.

In some cases a softer-lower polymer of polybutene may be used for the same purpose as the wax and in that case less amorphous wax may be used. The use of wax or its equivalent provides a softer and more plastic final gasket.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

We claim:

A compound for lining the sealing flanges of can ends and the like which is resistant to animal and vegetable oils and highly economical, which comprises a homogeneous mixture of about 44 percent by weight of a solid linear polymer of polybutene, about an equal percentage by weight of wood flour and about 12 percent by weight of amorphous wax, said mixture being dispersed in a solvent having a boiling range of about 140 degrees F. to 160 degrees F.

JOHN E. ROBINSON.
FRANK H. BOPP.
PAUL W. MILLELOT, Jr.